Figure 1:
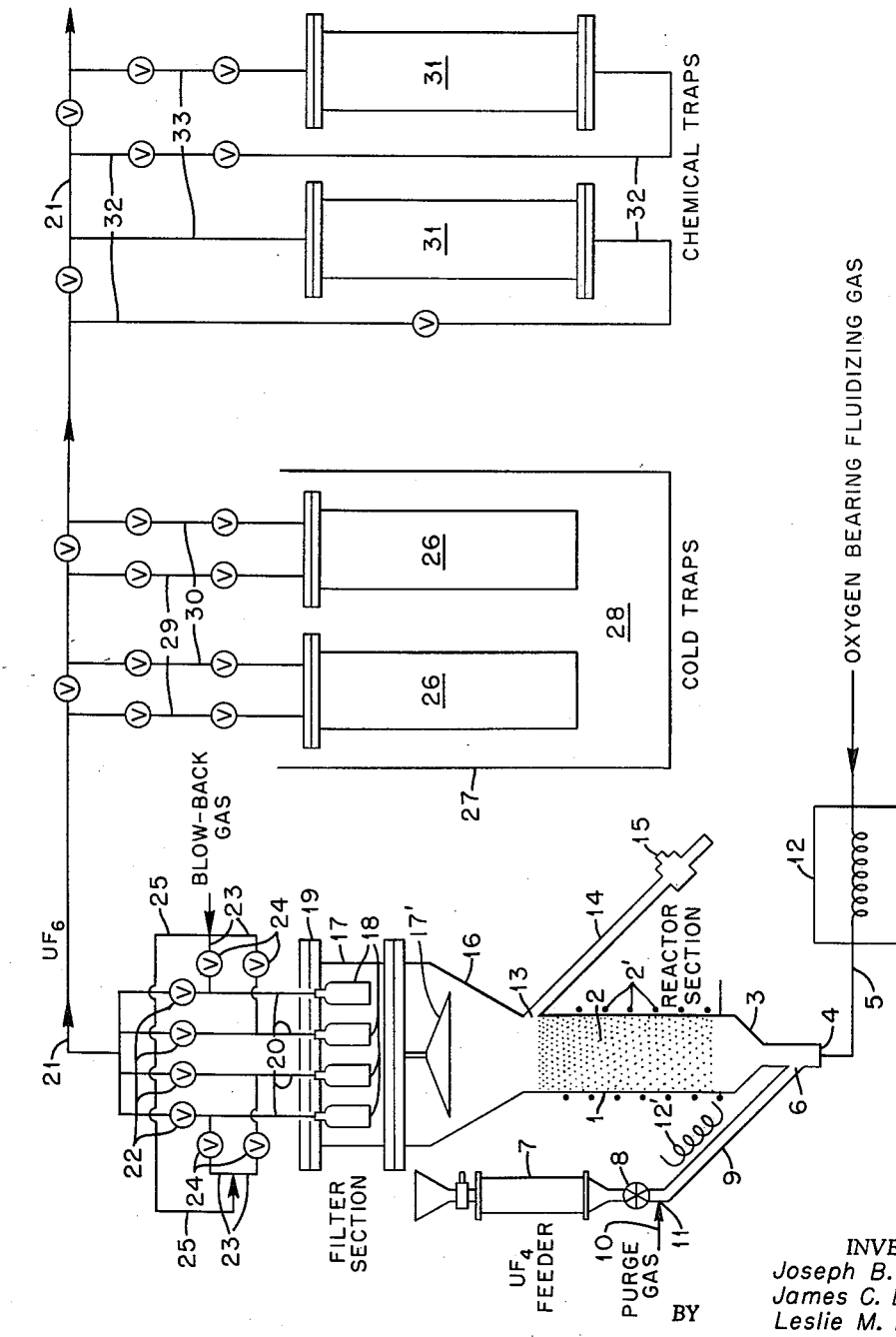

INVENTORS.
Joseph B. Adams
James C. Bresee
Leslie M. Ferris
Charles D. Scott

ATTORNEY

INVENTORS.
Joseph B. Adams
James C. Bresee
Leslie M. Ferris
Charles D. Scott

ATTORNEY

UNITED STATES PATENT OFFICE 3,009,768
Patented Nov. 21, 1961

3,009,768
CONTINUOUS PROCESS FOR PREPARING URANIUM HEXAFLUORIDE FROM URANIUM TETRAFLUORIDE AND OXYGEN
Joseph B. Adams, James C. Bresee, Leslie M. Ferris, and Charles D. Scott, all of Oak Ridge, Tenn., assignors to the United States of America as represented by the United States Atomic Energy Commission
Filed Apr. 24, 1959, Ser. No. 808,856
9 Claims. (Cl. 23—14.5)

Our invention relates to the preparation of uranium hexafluoride and more particularly to an improved method of converting uranium tetrafluoride to uranium hexafluoride.

Large-scale conversion of $UF_4$ to $UF_6$ is currently effected by reacting $UF_4$ with fluorine. This process presents serious disadvantages in that elemental fluorine is both extremely expensive and difficult to handle because of its corrosiveness and toxicity. Consequently, it is desirable to prepare $UF_6$ from $UF_4$ without the use of fluorine.

One method of preparing $UF_6$ from $UF_4$ without the use of fluorine utilizes the reaction of $UF_4$ and oxygen at elevated temperatures as disclosed in U.S. Patent 2,535,572. While small quantities of $UF_6$ may be prepared by conducting this reaction in a tube-type reactor as disclosed in this patent, the application of this process to large-scale equipment has presented numerous difficulties. $UF_4$ exhibits a strong tendency to sinter at the elevated temperatures, i.e., above approximately 750° C., required for a reaction rate sufficiently rapid to allow high throughputs in large-scale equipment. Merely contacting $UF_4$ and oxygen in conventional gas-solid reactors at these temperatures results in the formation of sintered agglomerates, thus drastically reducing the surface area and the reactivity of the solids and plugging the reactor. In addition, the high temperature and high $UF_4$ content in the solids bed are favorable to the formation of large amounts of intermediate compounds $U_4F_{17}$, $UF_5$ and $U_2F_9$, which must be separated from the product $UF_6$ and recycled to the reactor. Low yields have resulted both because of this $UF_4$ sintering and intermediate formation and because of the adverse effects of small amounts of moisture in the system. Another problem presented in conducting this reaction on a large scale is the provision of a method of converting by-product uranyl fluoride to $UF_4$ and recycling the $UF_4$.

Additional problems are presented in converting impure $UF_4$ to $UF_6$. $UF_4$ may be prepared directly from uranium ore concentrates by reduction and hydrofluorination without employing the processes such as solvent extraction which are currently used for purifying ore concentrates in large-scale production. Elimination of the need for the purification process would result in substantial economic gain. This directly prepared $UF_4$, however, may contain substantial amounts, e.g., up to 10 percent, of various impurities such as sodium, iron or calcium. The presence of such impurities lowers the sintering temperature and melting point of $UF_4$, thus further increasing the sintering difficulties in the $UF_4$-oxygen reaction.

It is, therefore, an object of our invention to provide a large-scale method of preparing $UF_6$ from $UF_4$ without the use of fluorine.

Another object is to provide a method of reacting $UF_4$ with oxygen in which the deleterious effects of $UF_4$ sintering and the formation of uranium-fluoride intermediates are minimized.

Another object is to provide a method of preparing $UF_6$ from $UF_4$ in which high yields are obtained.

Another object is to provide a method of recycling uranyl fluoride produced in the reaction of $UF_4$ with oxygen.

Another object is to provide a method of converting impure $UF_4$ to $UF_6$.

Other objects and advantages of our invention will be apparent from the following detailed description.

In accordance with our invention, $UF_6$ may be prepared from $UF_4$ by introducing finely divided dry $UF_4$ and a dry oxygen bearing gas into a bed of finely divided dry $UO_2F_2$ under such conditions as to fluidize the reaction bed, maintaining the bed at a temperature from 600° C. to 900° C. until substantially complete conversion to $UF_6$ and $UO_2F_2$ is obtained and recovering the $UF_6$. The $UO_2F_2$ bed functions as an inert solids diluent and reaction medium, with bed sintering and the resultant difficulties being minimized by this means. The use of a $UO_2F_2$ bed is particularly advantageous for a continuous process since $UO_2F_2$ is a reaction by-product, being continually formed as the $UF_4$ is expended. Removal of the $UO_2F_2$ may be readily accomplished by merely providing an overflow at the top of the reaction bed. Fluorine is not required in this method, and the difficulties previously encountered in adapting the $UF_4$-oxygen reaction to large-scale operation are minimized. Relatively high yields are obtained and by-product $UO_2F_2$ may be reconverted to $UF_4$ and recycled, thus providing an economical method of preparing large quantities of $UF_6$.

The reaction of $UF_4$ and oxygen proceeds as follows:

$$2UF_4 + O_2 \rightarrow UO_2F_2 + UF_6$$

As may be seen from this equation, $UO_2F_2$ is formed in large quantities during the course of the reaction, thus necessitating recycle of this material for high overall yields. Intermediate compounds $UF_5$, $U_2F_9$ and $U_4F_{17}$ may also be formed as a result of side reactions which occur, particularly when product $UF_6$ is exposed to high concentrations of finely divided $UF_4$. The side reactions are represented by the following equations:

$$UF_4 + UF_6 \rightarrow 2UF_5$$
$$3UF_4 + O_2 \rightarrow 2UF_5 + UO_2F_2$$
$$2UF_5 \rightarrow \tfrac{2}{3}U_2F_9 + \tfrac{2}{3}UF_6$$
$$\tfrac{2}{3}U_2F_9 \rightarrow \tfrac{2}{7}U_4F_{17} + \tfrac{1}{21}UF_6$$
$$\tfrac{2}{7}U_4F_{17} \rightarrow UF_4 + \tfrac{1}{7}UF_6$$

These intermediates, and in particular $U_4F_{17}$, become entrained in the product gas stream in either solid or gaseous form and require separation. Upon return to the reaction bed, however, they decompose to yield $UF_4$ and $UF_6$. Thus, when the intermediates are continuously returned to the bed at steady state operation, they will be present only in small equilibrium amounts in the reactor system.

The $UF_4$-oxygen reaction is conducted in a conventional fluidized bed reactor initially charged with a bed of finely divided $UO_2F_2$, which functions as an inert solids diluent and reaction medium. Although $UO_2F_2$ decomposes to yield $UF_6$, $U_3O_8$ and oxygen at temperatures above 800° C. in an inert sweep gas, we have found that decomposition is slight under the conditions employed in the present method, that is, in the presence of $UF_6$ and oxygen. In addition, any uranium oxide present in the bed react with $UF_6$ to form $UO_2F_2$ and $UF_4$. The $UO_2F_2$ bed may thus be maintained throughout the course of the reaction without difficulty from this source.

In order to avoid the above-described sintering and intermediate-formation difficulties, the $UF_4$ concentration in the $UO_2F_2$ bed must be maintained at a relatively low level. A $UF_4$ concentration in the bed of less than approximately twenty-five percent by weight is required, and a concentration less than approximately ten percent is preferred. Higher concentrations are favorable both to sintering and intermediate formation at practical operating temperatures. The $UF_4$ concentration in the bed may be controlled by adjustment of operating variables. $UF_4$ concentration is dependent on the feed rate and the reaction rate of the $UF_4$, which in turn depends upon the temperature and other factors such as the concentration of oxygen in the oxygen-bearing gas. At a given feed rate an increase in the operating temperature increases the reaction rate and thus reduces the $UF_4$ concentration. The reaction rate decreases and the $UF_4$ concentration increases with the use of a dilute oxygen-bearing gas such as air.

$UF_4$ is introduced into the $UO_2F_2$ bed by means of a solids-carrying gas stream, and an oxygen-bearing gas is concurrently introduced at sufficient velocity to maintain the bed in a fluidized state. The composition of the $UF_4$-carrying gas is not critical, and any gas which does not contaminate the product or cause competing side reactions may be employed. It is preferred to employ the same gas for carrying the $UF_4$ and for fluidizing the bed, with a major portion of the fluidizing gas being introduced in a separate stream. The oxygen-bearing fluidizing gas may comprise substantially pure oxygen or a diluted oxygen-bearing gas such as air. Because of the loss of product $UF_6$ to by-product $UO_2F_2$ which occurs as a result of the presence of moisture in the system, it is essential that all reactant streams be dried and kept free of moisture.

The particle size of the initial $UO_2F_2$ and the $UF_4$ feed is not critical to our invention, and any material which is sufficiently finely divided to be maintainable in a fluidized state may be employed. The particle size to be used depends on the design of the particular reactor involved. For example, for a four-inch diameter fluidized bed reactor it is preferred to employ initial $UO_2F_2$ and $UF_4$ feed sized to larger than 150 and smaller than 20 U.S. standard mesh. A wider range of particle sizes may be employed in larger diameter reactors, where fluidization may be more readily controlled. Larger particles in general require excessive amounts of fluidizing gas.

The reaction of $UF_4$ and oxygen is effected by maintaining the fluidized bed at a temperature within the range of 600° C. to 900° C. At temperatures below 600° C. the reaction rate is impractically low, and above 900° C. sintering or melting tends to occur in the reaction bed. For substantially pure $UF_4$ feed a temperature within the range of 750° C. to 850° C. is preferred. A slightly lower temperature, that is, from 700° C. to 750° C., is preferred for $UF_4$ containing impurities which tend to lower the $UF_4$ melting point. Although the method of heating the bed is not critical, it is preferred to heat the initial $UO_2F_2$ by passing a stream of a heated gas such as nitrogen through the bed to reach the operating temperature and to maintain this temperature by preheating the influent gas streams to the bed temperature prior to introducing the gas into the reactor. Maximum heat utilization may be obtained by first circulating the unheated fluidizing gas stream around the outside of the reactor at a point above the bed level. This serves both to cool the product gas as required for filtering and to supply a portion of the heat needed to bring the influent gas to operating temperatures. Conventional external heating coils may also be employed to maintain the desired bed temperature.

Alternatively, a portion of the reaction heat may be obtained by supplying carbon monoxide to the bed in combination with the fluidizing oxygen stream. Combustion of the carbon monoxide is catalyzed by solids within the bed so that heat is produced homogeneously throughout the bed, with heat transfer problems being minimized by this procedure. High purity carbon monoxide is required, since either moisture or hydrogen-containing gases which yield water vapor upon combustion lower the yield of product $UF_6$. In this alternative procedure the bed temperature may be controlled by varying the amount of carbon monoxide.

As the reaction proceeds, product $UF_6$ is liberated as a vapor into the effluent gas stream. In addition to $UF_6$, the effluent stream is comprised of oxygen, other noncondensable gases, small amounts of HF and entrained solid particles, chiefly $UO_2F_2$ fines and the intermediates $UF_5$, $U_2F_9$ and $U_4F_{17}$. Product $UF_6$ may be readily recovered from this stream by filtering the gas to remove solid particles and passing the gas through conventional cold traps to freeze out the $UF_6$. Filtration of the product gas stream is preferably conducted within the fluidized bed reactor by providing a baffle and a filter above the level of the bed. The solid intermediates may be returned to the bed, by merely cleaning the filter and allowing the solid particles to fall. Filtration may also be effected in a separate vessel, but recycle of the separated solids is rendered more difficult. For continuous operation, it is also preferred to use a plurality of filters so arranged that one filter is alternately being cleaned by an automatic gas blowback system while the other filters are in operation. The choice of gas for this operation is not critical as long as the gas is inert to $UF_6$ and it is dry. The same gas as the fluidizing stream may be used. The filtered solids fall back into the bed and are converted to $UF_4$ and $UF_6$. In order to provide for effective removal of intermediates, filtration is conducted at an effluent gas temperature below approximately 500° C., and preferably at about 200° C. At higher temperatures the uranium-fluoride intermediates are volatilized and thus are not amenable to removal by this means. The desired reaction and filtration temperatures may be maintained within one vessel by employing a relatively long vessel, with the lower portion containing the fluidized bed being heated and the upper or filtration section being cooled, preferably by circulating the unheated influent gas stream around the outside of the filter section. The filtered gas is then passed through conventional cold traps to freeze out the $UF_6$. In order to recover trace amounts of $UF_6$ the remaining gas is then passed through chemical traps comprising beds of material such as calcium sulfate, alumina or sodium fluoride which react with or absorb and retain the $UF_6$.

Since $UO_2F_2$ is produced in the $UF_4$—$O_2$ reaction, the quantity of this material increases during operation. The excess $UO_2F_2$ is readily removed and the bed maintained at a constant level by providing an overflow port at the top of the reaction bed. In order to provide a more economical overall yield, the $UO_2F_2$ may be reconverted to $UF_4$ and recycled to the $UF_4$ feed stream. Conversion of $UO_2F_2$ to $UF_4$ may be effected in a two-step procedure, comprising reduction of the $UO_2F_2$ with hydrogen to yield a mixture of $UO_2$ and $UF_4$, and hydrofluorination of this mixture to convert the $UO_2$ in the mixture to $UF_4$. The resulting $UF_4$ is then introduced into the oxidation reactor $UF_4$ feed stream. In the processing of impure $UF_4$ a portion of the $UO_2F_2$ is subjected to a purification step before reduction. Purification may be readily effected by any conventional means such as dissolution and precipitation, dissolution and solvent extraction or dissolution, ion exchange and reduction.

Another recycle procedure may be employed which provides further overall economic gain by utilizing the off-gases from the reduction and hydrofluorination reactions described above. In this procedure these off-gases, comprising HF, $H_2$ and water vapor, are contacted with $UO_3$ feed material to partially convert the $UO_3$ to $UO_2$ and $UO_2F_2$. The resulting mixture along with $UO_2F_2$ by-product from the oxidation reaction is then subjected to reduction and hydrofluorination to provide further $UF_4$ feed for the oxidation reaction. This procedure provides for more economical utilization of off-gases than is obtainable in conventional recovery operations.

The system in which the $UF_4$ oxidation process is carried out must be constructed of material resistant to fluorides at the high temperatures involved. Although our invention is not to be understood as so limiting, it is preferred to employ a nickel-base alloy available commercially under the trade name "Inconel" for components of the system subject to elevated temperatures such as the fluidized bed reactor when the pure $UF_4$ is the feed material and to use nickel as the reactor material when the impure $UF_4$ is used. The nickel-base alloy available under the trade name "Monel" may be employed for lower temperature components, such as cold-trap and chemical-trap piping.

Apparatus suitable for conducting the method of our invention is schematically depicted in FIGURE 1. The $UF_4$-oxygen reaction is carried out in a fluidized bed reactor 1 initially charged with a bed 2 of $UO_2F_2$ and provided with an external heater 2'. Below the bed the reactor is provided with an inwardly tapering portion 3, terminating in a cylindrical gas inlet 4. An oxygen-bearing fluidizing stream is introduced through the bottom of inlet 4 from an oxygen feed line 5. $UF_4$ entrained in a gas stream is introduced through an opening 6 in the side of inlet 4, the $UF_4$ being fed from a hopper 7 through a solids metering device 8 and line 9. The gas stream for carrying the $UF_4$ is introduced from a gas feed line 10 through an inlet 11 into $UF_4$ feed line 9. The influent reactants are brought to the required temperature by means of heaters 12, 12' on both the oxygen and $UF_4$ feed lines. As the reaction proceeds the excess $UO_2F_2$ is removed through an overflow port 13 into a downwardly extending overflow line 14. The $UO_2F_2$ flows through a solids valve 15 and is collected in a container (not shown). Above the overflow port, the reactor is provided with an outwardly tapering portion 16 terminating in a cylindrical filtering section 17. Entrained solid particles are removed from the effluent gas by means of a baffle 17' and sintered metal filters 18 positioned in the top 19 of the reactor. The filtered gas is removed through separate effluent gas lines 20 leading from each filter to a single product line 21. A blowback system is provided whereby each of the filters 18 is alternately cleaned automatically while the other filters are in operation. This system comprises valves 22 in lines 20 for shutting off product gas flow through the filter being cleaned, and gas lines 23 provided with valves 24 and leading from a blowback gas feed line 25 to effluent gas lines 20 below the valves 22, together with suitable instrumentation (not shown). Product $UF_6$ is recovered from the filtered effluent gas by cold-trapping in cylindrical metal cold traps 26 connected in series in a container 27 packed with coolant 28, which may suitably comprise a mixture of Dry Ice and trichloroethylene. The gas is introduced through a valved inlet line 29 terminating near the bottom of the cold trap. The $UF_6$ freezes out and the remaining gas passes out of the trap through a valved outlet line 30 at the top of the cold trap. Final traces of $UF_6$ are recovered by passing the gas through chemical traps 31 connected in series. These traps comprise containers packed with beds of a suitable absorbent such as calcium sulfate. The gas is introduced through a valved inlet line 32 at the bottom of the trap and removed through a valved outlet line 33 at the top. The chemical trap effluent gas is then discarded to the atmosphere. Product $UF_6$ is recovered from the cold traps and the chemical traps.

Figure 2:
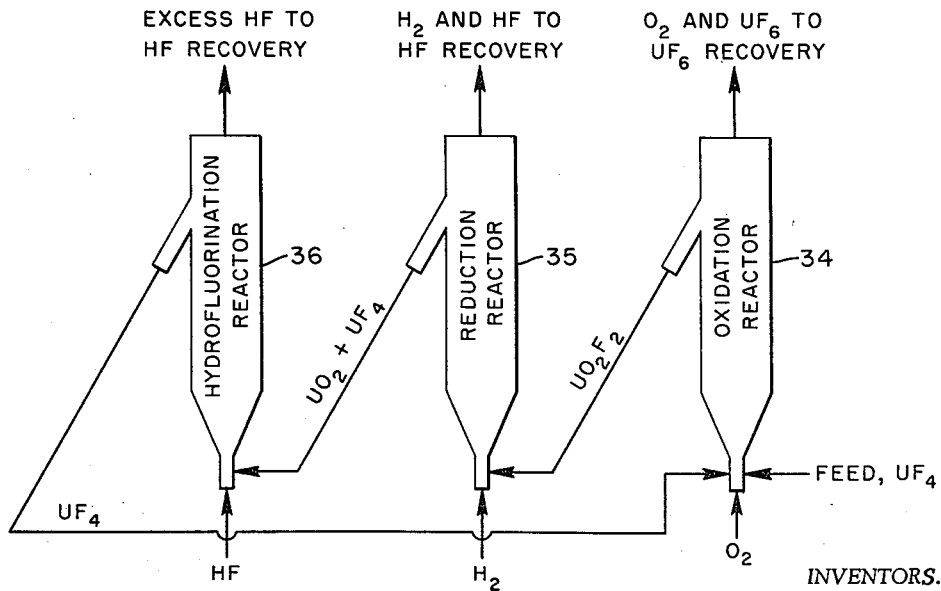

A system providing for recycle of $UO_2F_2$ is schematically illustrated in FIGURE 2. Feed $UF_4$ is converted to $UF_6$ and $UO_2F_2$ in an oxidation reactor 34 of the type described with reference to FIGURE 1. $UO_2F_2$ plus small amounts of $UF_4$ are removed from the reaction bed by means of an overflow and are conveyed to a reduction reactor 35 for reduction with hydrogen. The reduction product, a mixture of $UF_4$ and $UO_2$, is converted completely to $UF_4$ in a hydrofluorination reactor 36 and recycled to the oxidation reactor feed stream.

Figure 3:
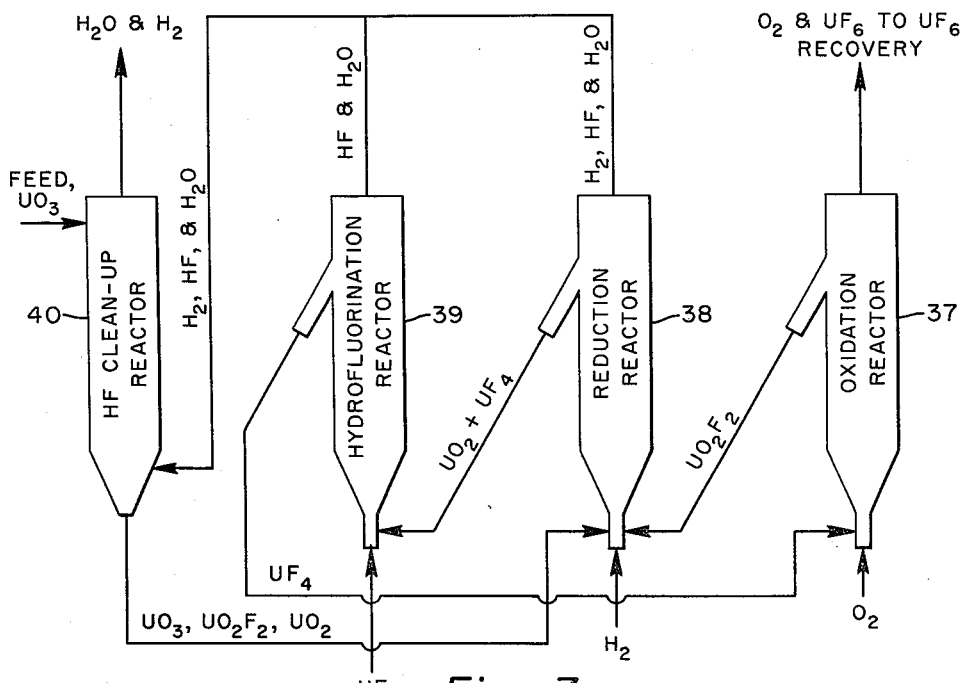

Another recycle system which provides for utilization of off-gases may be seen by reference to FIGURE 3. In this system $UO_3$ feed material is contacted with hydrogen, HF and water vapor off-gases from reduction and hydrofluorination reactors in an HF clean-up reactor 40. The product of the clean-up reactor, a mixture of $UO_3$, $UO_2F_2$ and $UO_2$, is converted to $UF_4$ by reduction with hydrogen in a reduction reactor 38 and with HF in a hydrofluorination reactor 39. The resulting $UF_4$ is then employed as feed for the oxidation reactor 37. $UO_2F_2$ overflows from the oxidation reactor and is converted to $UF_4$ in the same manner as the clean-up reaction product.

Our invention is further illustrated by the following specific examples:

EXAMPLE I

A $UF_4$ oxidation run was conducted in a four-inch diameter fluidized bed reactor of the type described above with reference to FIGURE 1. The 4 inch section of the reactor was 24 inches long and was operated at bed depth of 13½ inches. The top of the reactor was provided with a six-inch diameter filter section containing four sintered metal filters and a baffle inserted between the bed and the filters to serve as an impingement separator and to lower the filtering temperature. The reactor was initially charged with 5,917 grams of $UO_2F_2$, and 12,620 grams of $UF_4$ were fed into the bottom of the bed over a period of 9.25 hours at an average feed rate of 1.37 kilograms $UF_4$ per hour. Air, dried in molecular sieve beds to a dew point of $-100°$ C., was employed as the fluidizing gas and the $UF_4$-carrying gas. A bed operating temperature of $810°$ C.$\pm 15°$ C. was maintained by preheating the influent gas streams and supplying small amounts of heat through the walls. Steady-state concentrations of $UF_4$ in the bed was 21.9 percent. The effluent gas was filtered at a temperature of approximately $200°$ C., and the $UF_6$ was recovered by passing the filtered gas through cold traps and chemical traps. The concentration of $UF_6$ in the effluent gas was measured by means of a condensation pressure analyzer. At the conclusion of the run, 5.12 kilograms of $UF_6$ was recovered from the cold traps. Further details and results of this run may be seen by reference to the following table.

*Table I*

CHANGE IN AMOUNTS OF INDIVIDUAL COMPOUNDS IN $UF_4$ OXIDATION RUN

| Compound | Amount Entering Reactor, g. | Amount Leaving Reactor, g. | Change, g. |
|---|---|---|---|
| $UF_4$ | 12,620 | 1,811 | −10,809 |
| $UO_2F_2$ | 5,917 | 11,746 | +5,829 |
| $UO_2$ | 13 | 0 | −13 |
| $U_3O_8$ | 6 | 0 | −6 |
| Metal Fluorides | 18 | 64 | +46 |
| $H_2O$ | 26 | 0 | −26 |
| $O_2$* | 562 | 0 | −562 |
| $UF_6$— | | | |
| Collected** | 0 | 5,176 | +5,176 |
| (Measured) | 0 | (5,610) | (+5,610) |
| Totals | 19,162 | 18,797 | −365 |
| | | (19,231) | (+69) |

*The amount of $O_2$ entering the reactor was calculated to be the theoretical amount necessary for oxidation in the various reactions occurring.
**The amount of $UF_6$ reported as collected is that amount collected in cold traps and chemical traps and the amount of $UF_6$ reported as measured is that amount of $UF_6$ measured in the reactor off-gas by the condensation pressure analyzer.
Material balance (material leaving/material entering):
 98.1% using $UF_6$ collected.
 100.4% using $UF_6$ measured.

The 5,610 grams of measured $UF_6$ was 92.6 percent of the theoretical amount produced and the recovered amount 85.4 percent. The remainder of the $UF_6$ was consumed in side reactions with the reactor walls and with small amounts of uranium oxides and water in the system. The amount of water listed in Table I as entering the reactor was calculated from the moisture content of the feed. This run clearly demonstrates the relatively high yields obtainable by the method of our invention.

EXAMPLE II

A $UF_4$ oxidation run of longer duration was conducted in the apparatus used in Example I. 80.8 kilograms of $UF_4$ was fed into the bed over 58.4 hours at an average feed rate of 1.6 kg. $UF_4$ per hour. The operating temperature was 800° C. to 825° C., with one brief excursion to 775° C. Oxygen was employed as the $UF_4$ carrying gas, the fluidizing gas and the blow-back gas. The steady-state concentration of $UF_4$ in the bed was maintained at 2.2 to 4.5 percent, except for the last few hours of the run, when a mechanical failure in the $UF_4$ feeder produced a concentration of 46.4 percent. This high concentration of $UF_4$ resulted in sintering of some of the $UF_4$ in the bed, a build-up of solid materials on the walls and formation of large amounts of $U_4F_{17}$ which solidified in the upper portion of the reactor and restricted the mechanical gas flow. After correction of the mechanical failure, the bed could not be effectively refluidized, thus demonstrating the adverse effect of high $UF_4$ concentration in the bed. A total of 33.8 kilograms of $UF_6$ was recovered from the traps upon completion of the run. Other details and results of the run may be seen by reference to Table II.

Table II

CHANGE IN AMOUNTS OF INDIVIDUAL COMPOUNDS IN $UF_4$ OXIDATION RUN

| Compound | Amount Entering Reactor, g. | Amount Leaving Reactor, g. | Change, g. |
|---|---|---|---|
| $UF_4$ | 80,802 | 8,627 | −72,175 |
| $UO_2F_2$ | 8,554 | 43,102 | +34,548 |
| $UO_2$ | 264 | 0 | −264 |
| $U_3O_8$ | 6 | 0 | −6 |
| $U_4F_{17}$ | 0 | 6,352 | +6,352 |
| $UF_6$ | 0 | 33,803 | +33,803 |
| Metal Fluorides | 30 | 556 | +526 |
| $H_2O$ | 144 | 0 | −144 |
| $O_2$* | 3,488 | 0 | −3,488 |
| HF** | 0 | 320 | +320 |
| Totals | 93,288 | 92,760 | −528 |

*The amount of $O_2$ entering the reactor was calculated to be the theoretical amount necessary for oxidation in the various reactions occurring.
**The amount of HF leaving the reactor was calculated to be the theoretical amount which resulted from the hydrolysis of $UF_6$. Over-all material balance (material leaving/material entering)=99.4%.

The amount of $UF_6$ recovered in this run represents 90.4 percent of the theoretical amount formed. The remainder of the $UF_6$ was consumed in side reactions, with 2.3 percent reacting with $UF_4$ to form $U_4F_{17}$ due to the high $UF_4$ concentration brought about by the mechanical failure.

The above examples are merely illustrative and are not to be understood as limiting the scope of our invention which is limited only as indicated in the appended claims. It is also to be understood that many variations in apparatus and procedure may be employed without departing from the scope of our invention.

Having thus described our invention, we claim:

1. The method of preparing $UF_6$ from $UF_4$ which comprises continuously introducing finely divided dry $UF_4$ and a dry oxygen-bearing gas into a bed of dry uranyl fluoride under such conditions as to fluidize said bed, maintaining said bed at a temperature within the range of 600° C. to 900° C. and at a $UF_4$ concentration under approximately 25 weight percent, continuously removing the solids present in said bed from the top of said bed and recovering the $UF_6$ formed thereby.

2. The method of claim 1, in which said continuously removed solids are subjected to reduction with hydrogen and to hydrofluorination and the resulting $UF_4$ is re-introduced into said bed.

3. The method of claim 2 in which the off-gases resulting from said reduction and said hydrofluorination are contacted with $UO_3$ to form a solids mixture comprising $UO_3$, $UO_2$ and $UO_2F_2$, the resulting solids mixture is subjected to reduction and to hydrofluorination and the $UF_4$ resulting thereby is re-introduced into said bed.

4. The method of preparing $UF_6$ from $UF_4$ which comprises continuously introducing finely divided dry $UF_4$ and a dry oxygen-bearing gas into a bed of finely divided dry $UO_2F_2$ in a vertical reactor under such conditions as to fluidize said bed, maintaining said bed at a temperature within the range of approximately 750° C. to 850° C. and at a $UF_4$ concentration under approximately 25 weight percent, continuously removing the solids from the top of said bed, continuously subjecting the resulting effluent gas to filtration at a temperature under approximately 500° C. and recovering $UF_6$ from the resulting filtered gas.

5. The method of preparing $UF_6$ from $UF_4$ containing up to approximately ten percent extraneous impurities which comprises continuously introducing said impure $UF_4$ in a dry, finely divided state and an oxygen-bearing gas into a bed of finely divided dry $UO_2F_2$ under such conditions as to fluidize said bed, maintaining said bed at a temperature within the range of 700° C. to 750° C. and at a $UF_4$ concentration under approximately 25 weight percent, continuously removing the solids from the top of said bed and recovering the $UF_6$ formed thereby.

6. The method of preparing $UF_6$ from $UF_4$ which comprises introducing finely divided, dry $UF_4$, a dry oxygen-bearing gas and carbon monoxide into a finely divided bed of $UO_2F_2$ under such conditions as to fluidize said bed, said carbon monoxide being continuously burned in said bed in an amount sufficient to maintain said bed at a temperature within the range of 600° C. to 900° C., said bed being maintained at a $UF_4$ concentration under approximately 25 weight percent, and recovering the $UF_6$ formed thereby.

7. The method of preparing $UF_6$ from $UF_4$ which comprises introducing finely divided dry $UF_4$ and a dry oxygen-bearing gas into a bed of finely divided uranyl fluoride under such conditions as to fluidize said bed, maintaining said bed at a temperature within the range of 600° C. to 900° C. and at a $UF_4$ concentration under approximately 25 weight percent and recovering the $UF_6$ formed thereby.

8. The method of preparing $UF_6$ from $UF_4$ which comprises continuously introducing finely divided dry $UF_4$ and a dry oxygen-bearing gas into the bottom of a bed of finely divided uranyl fluoride in a vertical reactor under such conditions as to maintain said bed in a fluidized state, maintaining said bed at a temperature within the range of approximately 750° C. to 850° C. and at a $UF_4$ concentration under approximately 10 weight percent, continuously removing the accumulated solids from the top of said bed, continuously separating entrained solid particles from the effluent gas stream at a temperature below 500° C., returning said separated solid particles to said bed and recovering $UF_6$ from the resulting solid-free effluent gas stream.

9. The method of preparing $UF_6$ from $UF_4$ which comprises introducing finely divided, dry $UF_4$ and a dry oxygen-bearing gas into the bottom of a bed of finely divided dry uranyl fluoride in a vertical reactor provided with a reaction zone in the lower portion of said reactor and a filtration zone at the top of said reactor under such conditions as to maintain said bed in a fluidized state, maintaining said bed in said reaction zone at a temperature within the range of approximately 750° C. to 850° C. and at a $UF_4$ concentration under approximately 10 weight percent, continuously removing the accumulated solids from the top of said bed, continuously filtering the effluent gas stream in said filtration zone at a temperature under 500° C., returning the solids removed by said filtration to said bed, and recovering $UF_6$ from the resulting filtered effluent gas stream.

References Cited in the file of this patent

UNITED STATES PATENTS

| | | |
|---|---|---|
| 2,535,572 | Hainer | Dec. 26, 1950 |
| 2,811,414 | Murphree | Oct. 29, 1957 |

OTHER REFERENCES

Fried et al.: AEC Report AEC D–2981, May 1945.
Kirsles et al.: AEC Report, K–567, March 15, 1950.
Perry: Chemical Engineers' Handbook, 3rd ed. (1950), page 1577, McGraw-Hill Book Co., New York.
Moore: AEC Report TID 7501 (Pt. 1) pp. 33–51, February 1956, pub. by D. Van Nostrand, Inc., New York, 1959.
Ferris: AEC Report ORNL–2180, March 14, 1957.
Leuitz et al.: Chem. Eng. Progress, vol. 53, No. 4, April 1957, pp. 199–202.
Ferris: "J. Amer. Chem. Soc.," vol. 79, pp. 5419–5421 (1957).
Franz et al.: AEC Document ORNL–2409, pp. 1–29, January 10, 1958.
Abstracts of Papers American Chemical Society, 133rd Meeting, San Francisco, Calif., pp. 9K and 10K, March 31, 1958.
Proceedings of the Second United Nations International Conference on the Peaceful Uses of Atomic Energy, September 1–13, 1958, vol. 4, pp. 44–57, United Nations, New York.
Harrington et al.: "Uranium Production Technology," pp. 505–507, 521, which refers to Bibliographic references (33) to (37).